(12) United States Patent
Greene et al.

(10) Patent No.: US 9,640,068 B2
(45) Date of Patent: *May 2, 2017

(54) DEVICE FOR ESTABLISHING COMMUNICATIONS INTEROPERABILITY AT AN INCIDENT SITE INCLUDING MEANS FOR RECORDING CRISIS INCIDENTS

(71) Applicant: BAE Systems Information and Electronic Systems Integration Inc., Nashua, NH (US)

(72) Inventors: Michael F. Greene, Amherst, NH (US); William E. Tonseth, Hudson, NH (US); Mihir D. Boal, Nashua, NH (US); William J. Delaney, Bedford, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 740 days.

This patent is subject to a terminal disclaimer.

(21) Appl. No.: 13/974,673

(22) Filed: Aug. 23, 2013

(65) Prior Publication Data

US 2013/0342361 A1   Dec. 26, 2013

Related U.S. Application Data

(62) Division of application No. 10/585,239, filed as application No. PCT/US2005/040711 on Nov. 10, 2005, now Pat. No. 8,520,700.

(Continued)

(51) Int. Cl.
G08C 19/00     (2006.01)
H04W 28/14    (2009.01)
(Continued)

(52) U.S. Cl.
CPC ............ *G08C 19/00* (2013.01); *H04W 28/14* (2013.01); *H04W 4/18* (2013.01); *H04W 76/02* (2013.01); *H04W 84/18* (2013.01); *H04W 92/18* (2013.01)

(58) Field of Classification Search
None
See application file for complete search history.

(56) References Cited

U.S. PATENT DOCUMENTS 5,252,979 A   10/1993  Nysen
5,619,531 A    4/1997  Taylor et al.
(Continued)

FOREIGN PATENT DOCUMENTS

EP    0 660 567    8/1996

OTHER PUBLICATIONS

Scott F. Midkiff et al. "Rapidly-Deployable Broadband Wireless Networks for Disaster and Emergency Response". Presented at the First IEEE Workshop on Disaster Recovery Networks (DIREN '02) Jun. 24, 2002. New York City, NY.

(Continued)

*Primary Examiner* — Firmin Backer
*Assistant Examiner* — Shawna M Kingston
(74) *Attorney, Agent, or Firm* — Daniel J. Long; Sand & Sebolt, LPA; Scott J. Asmus

(57) ABSTRACT

What is provided is recording capability for each of the modules utilized by the first responders and other personnel within the area of the incident, with the stored information at each of the first responders' modules being read out through the ad hoc network, where it can be uploaded to storage. The stored information can be displayed at an incident commander work station in real time to give the incident commander a realistic view of the timeline and the severity of the incident, as well as the response. The use of (Continued)

the ad hoc network permits offloading stored information from each of the first responders' modules so as to free up storage within the modules. By providing storage at every node of the ad hoc network, one has access to a timeline of the actions at the incident as well as redundancy, which enhances the memories and observational skills of the first responders. Incident reporting is made complete due to the fact of all recordings being made available at one node on the temporary ad hoc network from which information reports and analysis can proceed, as well as subsequent training.

9 Claims, 15 Drawing Sheets

Related U.S. Application Data

(60) Provisional application No. 60/626,572, filed on Nov. 10, 2004.

(51) Int. Cl.
*H04W 4/18* (2009.01)
*H04W 76/02* (2009.01)
*H04W 84/18* (2009.01)
*H04W 92/18* (2009.01)

(56) References Cited

U.S. PATENT DOCUMENTS

| | | |
|---|---|---|
| 5,729,680 A | 3/1998 | Belanger et al. |
| 5,917,854 A | 6/1999 | Taylor et al. |
| 5,937,176 A | 8/1999 | Beasley et al. |
| 5,987,011 A | 11/1999 | Toh |
| 5,987,024 A | 11/1999 | Duch et al. |
| 6,115,580 A | 9/2000 | Chuprun et al. |
| 6,223,053 B1 | 4/2001 | Friedmann et al. |
| 6,229,818 B1 | 5/2001 | Bell |
| 6,333,928 B1 | 12/2001 | Schaal et al. |
| 6,338,087 B1 | 1/2002 | Okanoue |
| 6,345,323 B1 | 2/2002 | Beasley et al. |
| 6,353,745 B1 | 3/2002 | Wehrend et al. |
| 6,415,330 B1 | 7/2002 | Okanoue |
| 6,430,395 B2 | 8/2002 | Arazi et al. |
| 6,472,982 B2 | 10/2002 | Eida et al. |
| 6,480,480 B1 | 11/2002 | Du |
| 6,574,266 B1 | 6/2003 | Haartsen |
| 6,600,501 B1 | 7/2003 | Israel et al. |
| 6,708,209 B1 | 3/2004 | Ebata et al. |
| 6,769,767 B2 | 8/2004 | Swab et al. |
| 6,807,165 B2 | 10/2004 | Belcea |
| 6,996,782 B2 | 2/2006 | Parker et al. |
| 7,034,678 B2 | 4/2006 | Burkley et al. |
| 7,091,852 B2 | 8/2006 | Mason et al. |
| 2002/0114286 A1 | 8/2002 | Iwamura et al. |
| 2002/0191635 A1 | 12/2002 | Chow et al. |
| 2003/0158954 A1 | 8/2003 | Williams |
| 2004/0072568 A1 | 4/2004 | Kim |
| 2004/0203437 A1 | 10/2004 | Burch et al. |
| 2004/0209617 A1 | 10/2004 | Hrastar |
| 2006/0036185 A1 | 2/2006 | Lewicke et al. |
| 2006/0069998 A1 | 3/2006 | Artman et al. |
| 2009/0077601 A1 | 3/2009 | Brailean et al. |
| 2010/0145163 A1 | 6/2010 | Lewicke |

OTHER PUBLICATIONS

Communications—Applied Technology, 2001.
ICRI—Incident Commanders Radio Interface. (Per Internet Archive: first appeared in Jan. 2002).

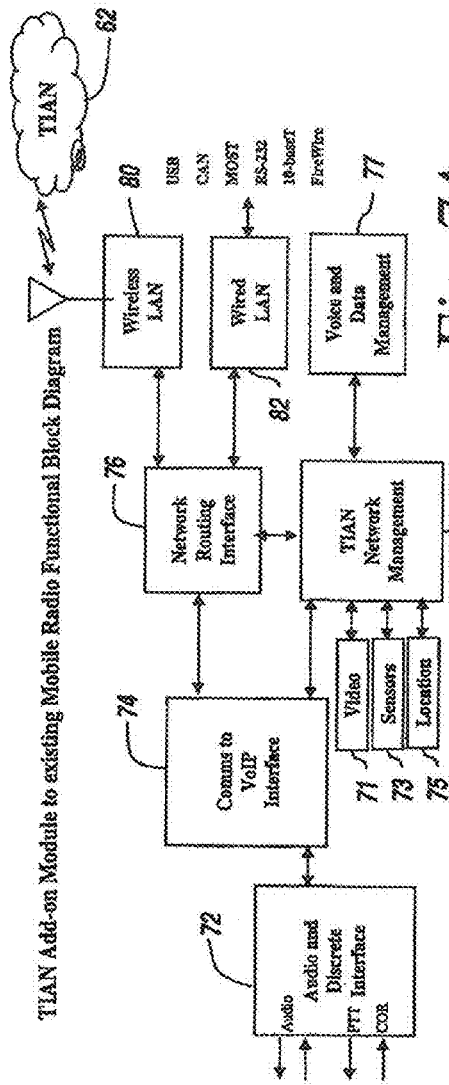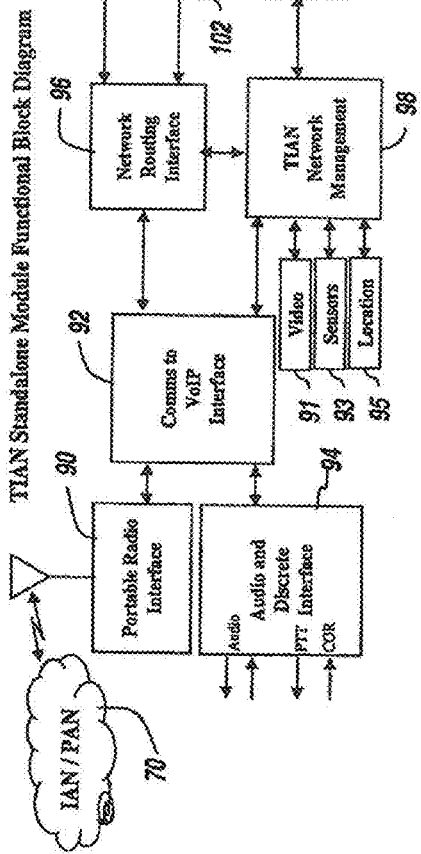

DEVICE FOR ESTABLISHING COMMUNICATIONS INTEROPERABILITY AT AN INCIDENT SITE INCLUDING MEANS FOR RECORDING CRISIS INCIDENTS

RELATED APPLICATIONS

This Application is a divisional of Ser. No. 10/585,239 filed Jun. 29, 2006 and claims rights under 35 USC §119(e) from U.S. Application Ser. No. 60/626,572 filed Nov. 10, 2004, the contents of which are incorporated herein by reference. This application is related to U.S. patent application Ser. No. 10/943,323 filed Sep. 17, 2004 and Ser. No. 60/575,774 filed May 28, 2004, the contents of both of which are incorporated herein by reference.

FIELD OF THE INVENTION

The present invention relates to mobile communications and more particularly to an ad hoc temporary incident area network module having recording capability.

BACKGROUND OF THE INVENTION

The above-referenced U.S. patent application Ser. No. 10/943,232 discloses an ad hoc emergency interoperability communication network which is established by providing universal temporary incident area network modules that communicate with each other on a network using a common frequency and modulation format such as provided by 802.11. In one embodiment the ad hoc network is established when vehicles containing the temporary incident area network modules are within range of each other. The temporary incident area network modules are such as to have an RF or other connection with handheld or in-vehicle communications devices of whatever variety that have standardized voice, data and push-to-talk channels. Upon receipt of a transmission from the standard transceiver, the signals are converted to the common network frequency and format and transmitted around the network. The system thus allows communications amongst the responders to an incident without having to set up prearranged protocols, equipment compatibilities, or equipment addressing.

Moreover, command and control structure can be achieved through an incident commander having access through his own temporary incident area network module to be able to route and control the flow of information of the net. Portable temporary incident area network modules may be provided to provide range extension capabilities, for instance, for battery-powered handheld modules. Moreover, in one embodiment, switches are provided on the communications equipment for the individual to be able to have the communications equipment switched between the ad hoc temporary incident area network and the closed network of the department for whom the individual works.

It should be noted that after every major incident, many reports are written where the first responder is required to record from memory the sequence of events, and in as much detail as possible. These reports are reviewed and analyzed to learn how to improve first responder activities. However, the accuracy of these reports is dependent upon the memory the individuals. Also, reports from various agencies have to be manually integrated in a time sequence.

The result of such prior art reporting is that the reporting is time consuming and inaccurate and depends on the recall of individuals embroiled in a crisis situation. Moreover, manual integration of many reports to provide a full description of an incident can take weeks or even months.

Thus, regardless of the ability to provide for ad hoc communications between individuals of different departments using differing communications equipment, there is a need for real-time recording so as to be able to quickly analyze the crisis situation at the time of the incident, to be able to plan for a real-time response at the incident scene as well as to provide post-incident reporting and to be able to enable post-incident re-creation and analysis, that inter alia assists in training as well as evaluation of the response to the incident.

Presently, first responders have very limited recording capability, if any. If a responding agency arrives at a scene and they are connected to their own dispatch organization, at least as to that dispatch organization there may or may not be recording of the communications from the incident.

However, if there is a second responding agency with a dissimilar radio, individuals carrying these radios might not be connected to the same dispatch organization, thus precluding recording of the entire incident. Thus, for multiple responders, one dispatch organization might be recording a conversation from one first responder, whereas another dispatch organization might be recording a conversation from another first responder. The result is a disjointed and incomplete record of what is transpiring at the incident scene.

With the provision of interoperability comes the ability to piece together what is happening at an incident scene in real time. In so doing, one would like to be able to provide the incident commander with the ability to go back in time and look at pieces of data, which may include sensor data, the positions of where people are at a certain time, and be able to instantly understand what is happening at the incident scene.

For instance, one might have someone who is walking through a building when a sensor goes off and one might want to go back and find out the location of the sensor and download its information.

Typically, one would also like to go back and review, like an instant replay, what is happening at the incident scene. One would also like to be able to give the incident commanders a slow-motion view of what has just happened and be able to go back and look at what has been collected just minutes ago and use the information to perform the particular service without having to put someone in harm's way to go in and figure out what happened. Moreover, with location information one can pinpoint through map overlays exactly what has happened where and to put it on a timeline.

If the incident commander could be provided with a timeline and a map overlay, one could for instance determine a HAZMAT hotspot, its location, the time of occurrence, and the level of danger caused by such HAZMAT threat.

In addition to real-time processing to be able to provide an incident commander with updated information by which he can direct his forces to operate more efficiently and safely, one would like to be able to give the incident commander, and in fact all involved in post-incident analysis the data from the incident and make it available hours or days later. The post-incident data could include first responder position, sensor data, and video information obtained from the scene.

What is therefore also needed in post-incident analysis is a convenient format to provide a timeline display that is meaningful in terms of what is happening at the incident scene, not only for near-real-time playback but also for post-incident reporting, post-incident re-creation and analysis, and follow-on training.

Therefore there needs to be a convenient system of providing both real-time and post-incident reporting when using the aforementioned ad hoc emergency interoperability communications network.

SUMMARY OF INVENTION

In order to provide for real-time and post-incident reporting, each temporary ad hoc network unit or module is provided with recording capability. The recorded information can include the voice information that is transmitted over the ad hoc network, position information of each responder or unit, video information and sensor information, such as HAZMAT information, air quality information and the like.

It is noted that the depth of recorded information is limited only by available non-volatile memory at each of the units, which may be portable battery-powered units coupled to the transceiver carried by each of the individuals.

Note in one embodiment the most recent information is stored at the module, whereas older information is discarded when memory capacity is reached. This is necessitated by handheld units whose size precludes large storage capacity. However, limited module storage is not a problem because all information on the ad hoc network is recorded at least at one location where storage capacity is sufficient such as a dispatch office or storage facility.

Thus, with each of the individual modules being provided with a small amount of memory due to the real-time reading out of the information over the temporary network to unlimited storage, storage limitations are not a problem.

Thus, while fixed memory allocations can be defined for each of the information storage types, such as voice, video, sensor information and position, especially for battery-powered handheld units, depth of information recorded need not be great, since the information is transmitted in semi-real time over the network where it can be picked off, read and stored as, for instance, at an incident commander work station.

When an incident commander work station is present, each of the temporary ad hoc network units can upload recorded information in the background. The incident commander work station this provides backup for the temporary ad hoc network module's recorded information and can provide the incident commander with near-real-time playback capability.

Moreover, as mentioned above, the incident commander work station can provide extended memory for each of the temporary ad hoc network modules.

Note, in one embodiment, with module storage and uploading onto the temporary ad hoc network, storage can be located at an agency's station, parking garage or fuel/service station, wherever is convenient.

Secondly, the centralized temporary ad hoc network recording storage is responsible for archiving the recorded information, which can be used in post-incident analysis and training.

Also, once the temporary ad hoc network unit uploads all information to storage and the upload is confirmed, then the modules can erase the recorded information, which frees up memory space, especially valuable for handheld units.

As a further feature of the subject invention, in one embodiment the display at the incident commander work station displays sensor data, plays recorded conversations and outputs video data, all along a timeline visible at the bottom of the screen. The incident commander can select the details of the data he wishes to access by moving a vertical line intersecting the timeline so that the incident commander can concentrate on the scene and activities at a chosen point in time.

In summary, what is provided is recording capability for each of the modules utilized by the first responders and other personnel within the area of the incident, with the stored information at each of the first responders' modules being read out through the ad hoc network, where it can be uploaded to storage. The stored information can be displayed at an incident commander work station in real time to give the incident commander a realistic view of the timeline and the severity of the incident, as well as the response. The use of the ad hoc network permits offloading stored information from each of the first responders' modules so as to free up storage within the modules. By providing storage at every node of the ad hoc network, one has access to a timeline of the actions at the incident as well as redundancy, which enhances the memories and observational skills of the first responders. Incident reporting is made complete due to the fact of all recordings being made available at one node on the temporary ad hoc network from which information reports and analysis can proceed, as well as subsequent training.

BRIEF DESCRIPTION OF THE DRAWINGS

These and other features of the subject invention will be better understood in connection with a Detailed Description, in conjunction with the Drawings, of which:

FIGS. 7A and 7B are functional block diagrams of the subject temporary incident area network for add-on and standalone embodiments of the subject invention;

DETAILED DESCRIPTION

By way of background, what is described is an ad hoc temporary incident area network and the operation thereof.

In order to facilitate the description of the subject invention, the following definitions provided:

Extended Area Network (EAN)—The city systems are in turned linked with county, regional, state, and national systems or extended area networks.

Jurisdiction Area Network (JAN)—The JAN is the main communications network for first responders. It provides a communication path for all first responder's communication units within a specific agency. Examples of a JAN are the communication system used by the NH State Police that is different from the JAN communication system used by the Hudson Fire Department that is different from the communication system used by the US Border Patrol.

Incident Area Network (IAN)—An incident area network is a network created for a specific incident by the responding agency. This network is temporary in nature and comprises all of the first responders from a specific agency. For example, the Hudson Fire Department will create an IAN so that all of their fire fighters can communicate at the local scene. The Hudson Fire Department IAN will not interoperate with the Hudson Police Department's IAN that is being used at the same scene to allow the responding policemen to communicate over.

Temporary incident Area Network (TIAN)—As public safety individuals and resources, such as ambulances and fire engines, come into an incident, the TIAN modules will automatically recognize the new responder, register them into the network, and authorize the network resource for communications and information exchange. The TIAN modules will provide a gateway function between each of the agencies IAN at the local scene.

Personal Area Network (PAN)—On the small scale, the PANs consist of network devices that interact with other devices that belong with the public safety individual. A first responder may be equipped with devices that are used to monitor the first responder's physical location, pulse rate, breathing rate, oxygen tank status, as well as devices for hazardous gas detection and voice communications. The devices are linked on a personal area network controlled by the first responder's communication unit.

Figure 1:
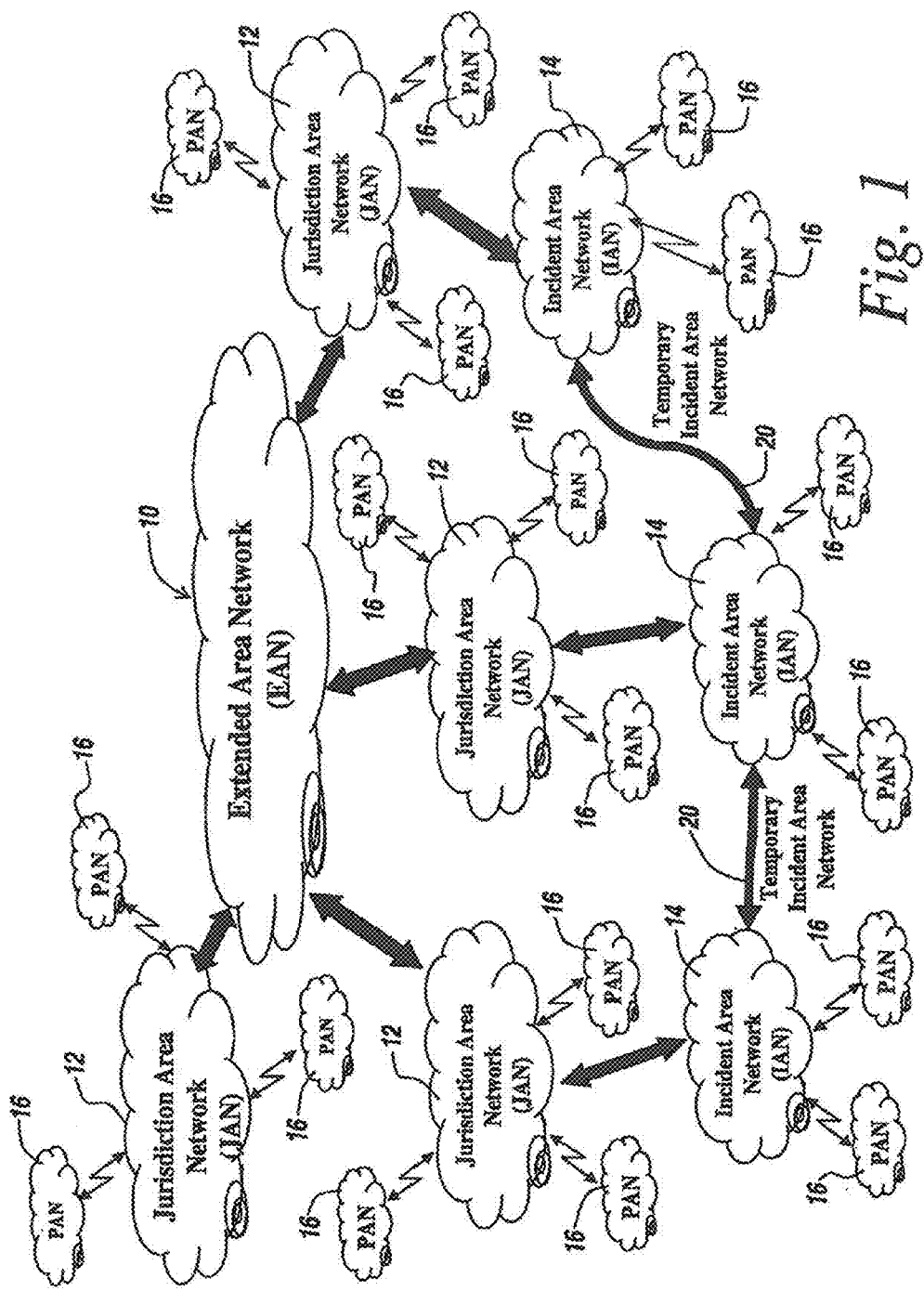
FIG. 1 is a hierarchical network structure diagram starting with an extended area network, and going down through a jurisdiction area network, to a personal area network connected to the other networks through an incident area network.

Referring now to FIG. 1, communication elements and the interconnection between elements as depicted as an hierarchical network structure with a PAN being the lowest level and an EAN being the highest level.

As can be seen in this figure, an extended area network 10 is coupled to jurisdictional area networks 12 that are in turn coupled to incident area networks 14 as illustrated. PANs 16 are coupled to respective incident area networks or jurisdiction, area networks, with the incident area networks being interconnected by a temporary incident area network designated by reference character 20 as will be described.

IANs are created at the scene of an incident and each first responder's agencies may create their own independent IANs. The isolated IANs are typically due to communication unit's dissimilar operating frequencies and protocols. The temporary incident area network connections are created by the TIAN modules to provide interoperability between IAN s at a scene of incident.

Figure 2:
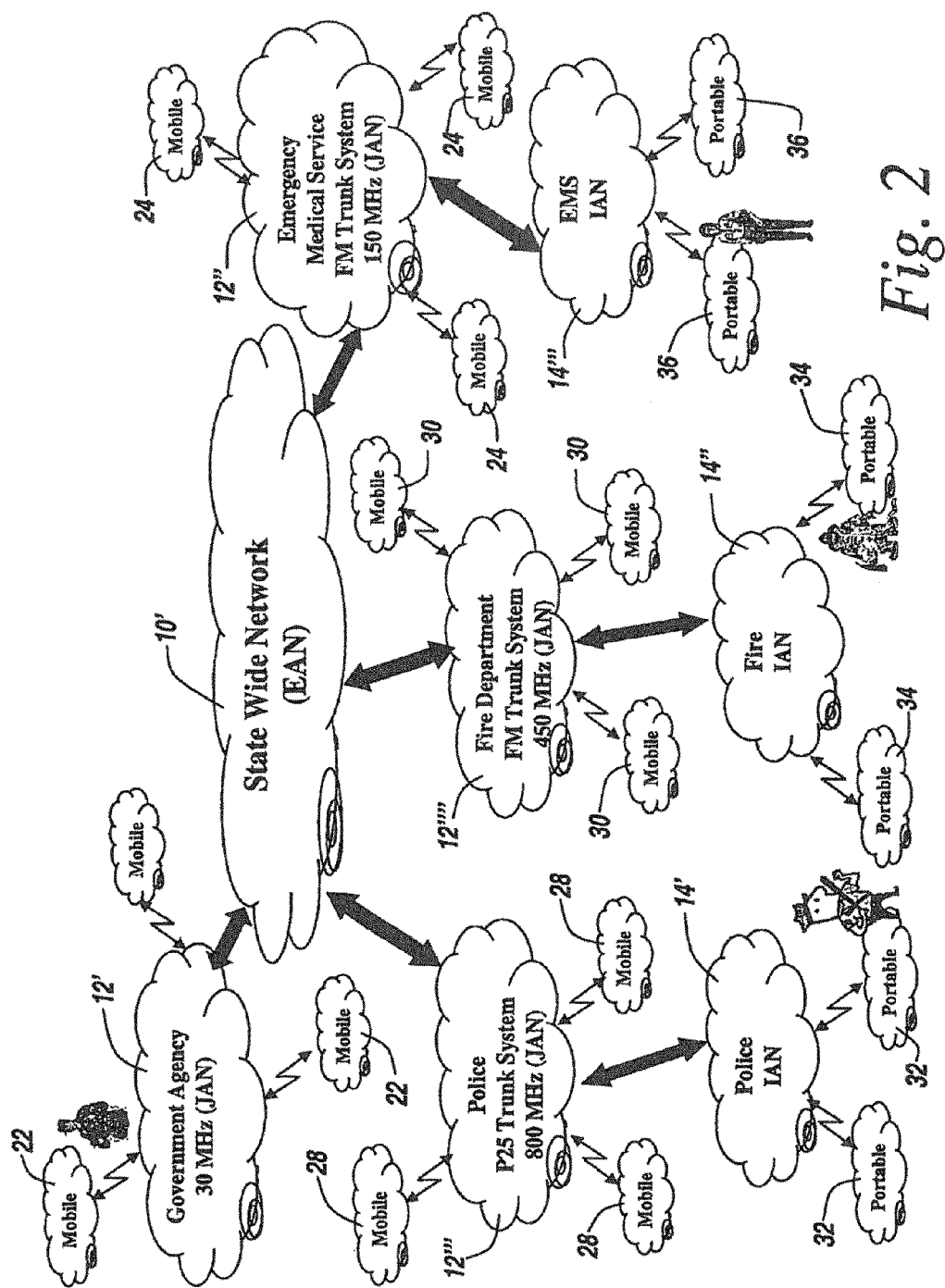
FIG. 2 is a hierarchical network structure diagram for an incident involving police and fire departments using the topology of FIG. 1.

Referring now to FIG. 2, for an everyday scenario it can be seen that a statewide network 10' constitutes the extended area network for a particular scenario that can involve governmental agency 12' forming a JAN that communicates with its PANS 22, which may be mobile units operating, for instance, at 30 MHz. Another JAN 12" constitutes an emergency medical network using an FM trunk system at 150 MHz, which has its mobile units 24 connected thereto by RE links or otherwise. A further JAN 12''' could be a police network using a P-25 trunk system operating at 800 MHz, with its mobile units 28 connected thereto. Likewise in the incident, a still further PAN 12'''' might be a fire department using an FM trunk system operating at 450 MHz, with its mobile units 30 also connected to the fire department trunk system.

The police, fire department and EMS units may desire to set up incident area networks, with the police IAN identified by reference character 14', the fire IAN by reference character 14" and the EMS IAN by reference character 14'''.

Each of the IANs support portable units respectively 32 for the police, 34 for the fire, and 36 for the EMS.

In operation, if one applies the communication systems that are available today for an everyday scenario like a residential fire call, the communication elements may be as illustrated. For the Policemen to communicate with the Firemen, the communication path is from the Policemen's communication unit (portable radio) through the Police IAN to the Police JAN to the county's FAN to the Fire JAN to the Fire IAN and finally to the Firemen's communication unit. Communication routing between the Firemen and EMS personnel is also as complex. Most of the communication path is away from the local incident with vulnerabilities such as access point congestion and message delays. The use of the ad hoc TIAN right at the local scene relieves the problems associated with an extended communication path away from the local incident.

As mentioned hereinbefore, responding to a local incident has involved rolling in specialized communication vehicles or distributing portable radios or PAN devices that interoperate. Moreover, there are everyday operation issues associated with these approaches. Specialized vehicles are expensive, limited, and may take time to arrive at the scene and more time to setup the temporary network. Distributing specialized PAN devices also has everyday operational tissues such as programming and configuration as well as lack of user familiarity.

Figure 3:
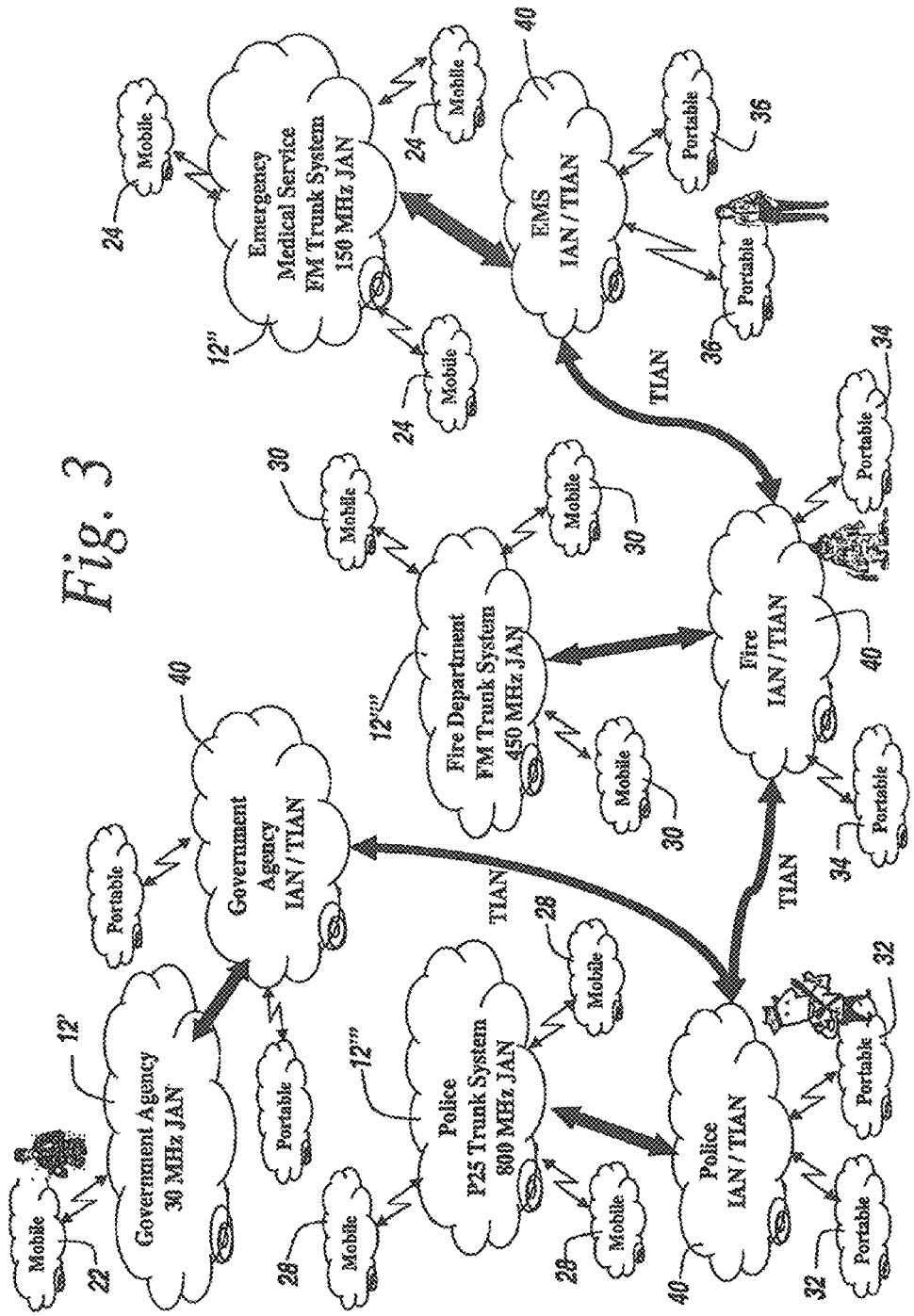
FIG. 3 is a hierarchical network structure diagram in which the incident area networks of FIGS. 1 and 2 are established by the subject temporary incident area network modules.

As shown in FIG. 3, as can be seen, each of the governmental agencies, police departments, fire departments or EMS units, substitutes for their IAN a temporary incident area network or TIAN 40. This is accomplished by the use of universal TIAN modules that provide each of the entities with the ability to intercommunicate. Although each IAN/TIAN can communicate directly over their own proprietary network with its corresponding intergovernmental agency, such as JAN 12', JAN 12", JAN 12''' and JAN 12'''', it is the links between the universal TIAN modules that provide the ad hoc network.

Thus, all communications between all of the agencies and personnel are routed through the TIAN modules. As illustrated, the temporary incident network area or TIAN of the subject invention solves the temporary network issue by building a temporary local area network to interconnect IANs right at the scene of the incident. This is accomplished by adding TIAN modules into an incident area network or IAN. When the first responder arrives at the scene, the TIAN module within the first responder's vehicle establishes a TIAN and monitors for other first responders to arrive at the scene of incident. As other responders arrive, their TIAN module connects to the TIAN in an ad-hoc fashion. The TIAN modules automatically share their JAN/PAN personalities and then communication is established between IANs and PANs. Voice, data, and video may be shared between PANs over the TIAN.

When the incident Commander (IC) arrives at the scene, the IC's temporary incident area network system will connect over the temporary incident area network TIAN and then will be presented with information on all of the subscribers on his PAN device. The IC can than take command of the scene and communicate with all of the first responders. The IC may create various talk groups among the responders, obtain status of all subscribers, and take command of the incident.

Figure 4:
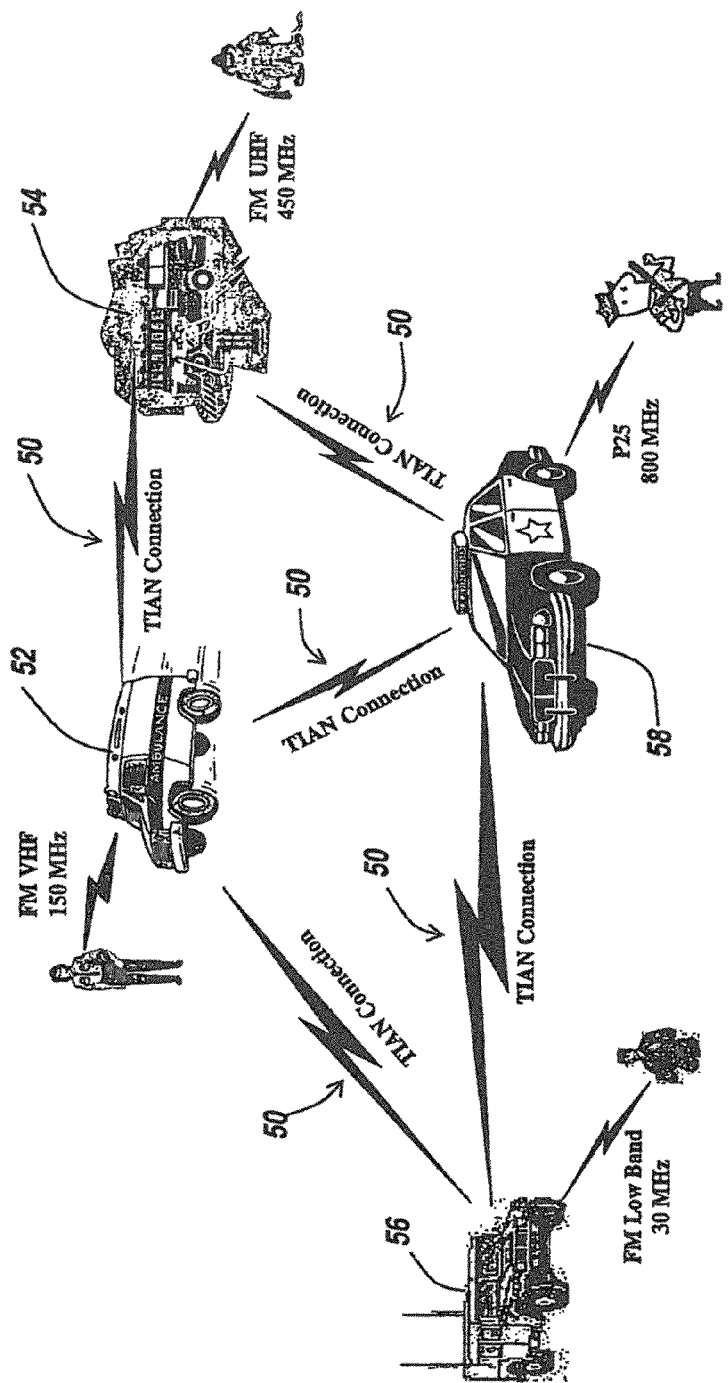
FIG. 4 is a diagrammatic illustration of the elements of a temporary network connections formed by first responders comprising police, military, EMS and fire personnel as they converge on an incident.

Referring now to FIG. 4, what is shown are the connections associated with a temporary incident area network. Here it can be seen that TIAN connections 50 are established, for instance, between an ambulance 52 operating with an FM-VHF carrier at 150 MHz, which may wish to communicate, for instance, with fire department personnel in a fire truck 54, which is designed to operate over an FM-UHF 450 MHz channel. Likewise, military personnel, for instance, in a Hum-V 56 that normally communicates over an FM low band at 50 MHz may wish to communicate with a squad car 58 that usually communicates with its personnel on the P-25 800 MHz channel.

What can be seen is that each of the entities shown in FIG. 4 communicates with its personnel over its own dedicated proprietary network, each with a different frequency, to say nothing of different protocols.

If one breaks down the TIAN into a lower level, what is actually happening is that a temporary ad hoc wireless area network is established between each of the responding vehicles right at the scene of incident as shown in FIG. 4. Each vehicle's TIAN module is a node within the mesh network and can be used for routing traffic and extending the networks range. Applying adaptive routing protocols, quality of service, and bandwidth broker techniques optimized the TIAN throughput and efficiency.

Temporary Incident Area Network System and Operation

Figure 5:
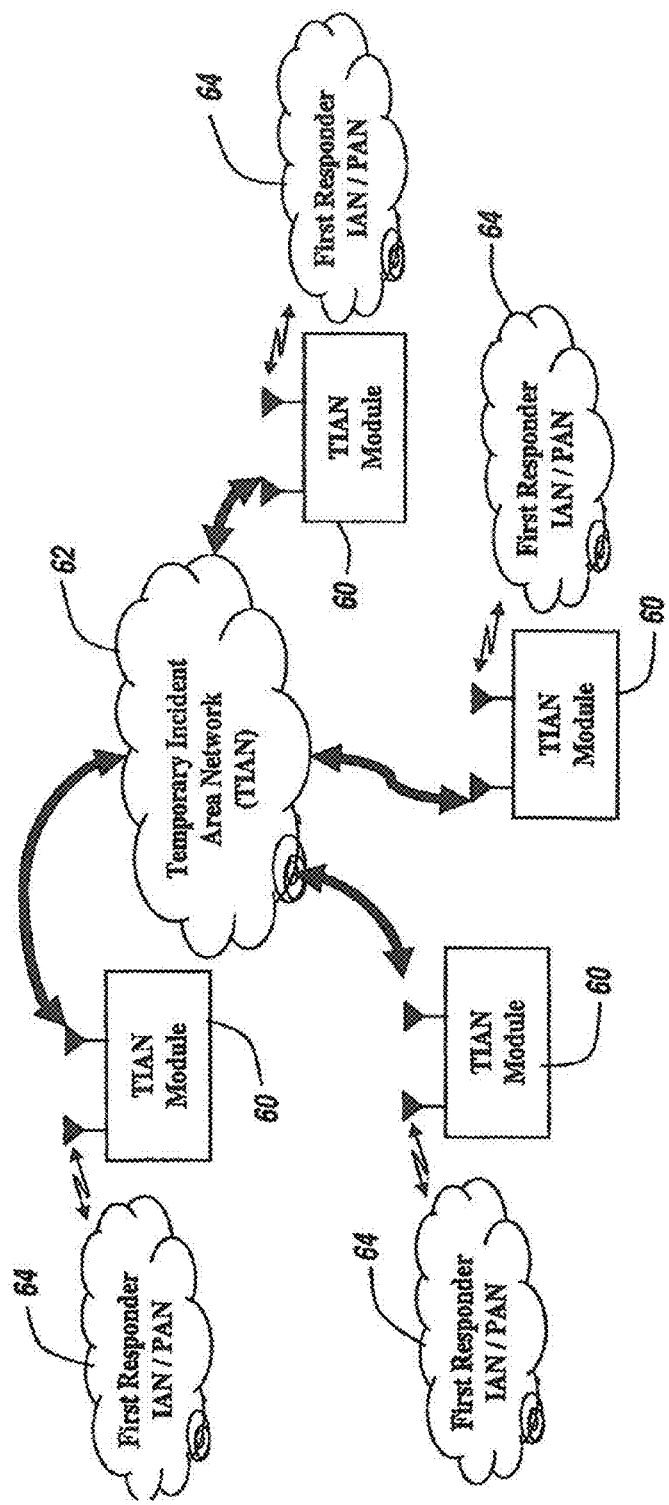
FIG. 5 is a diagrammatic illustration of the use of temporary incident area network modules to interconnect personal area network communications devices.

As shown in FIG. 5, a TIAN system consists of a number of TIAN modules 60 that form a temporary area network 62 and provide a gateway to dissimilar IANs. The TIAN system allows mutually exclusive first responder PANs 64, usually comprising portable radios, to interoperate at a local scene. Here each of the first responders is provided with the subject universal TIAN module.

Temporary Incident Area Network Module

Figure 6A:
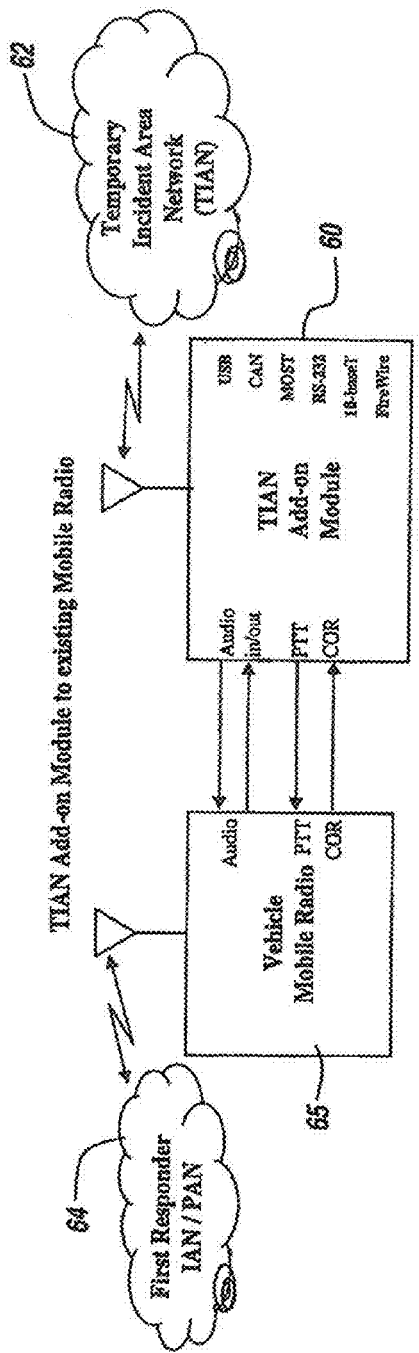
FIGS. 6A and 6B are diagrammatic illustrations respectively of add-on modules to existing mobile radios or standalone modules.
Figure 6B:
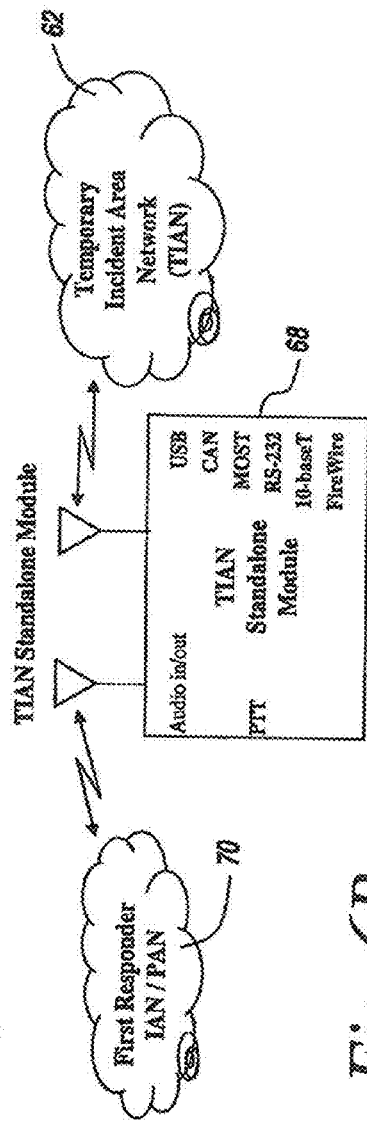

Referring to FIGS. 6A and 6B, in one embodiment the TIAN module 60 will reside within the first responder's vehicle as an add-on to the existing vehicular mobile radio 65 or as a standalone system 68. The TIAN add-on module interfaces to mobile radio 65 through standard Audio, PTT, and optional Carrier Operated Relay or CUR interfaces while the TIAN standalone system 68 provides the wireless interface to the first responder's PAN, here illustrated at 70.

The TIAN nodule will optionally provide standard wire network interfaces or standard automotive network interfaces. The network interfaces can provide a laptop interface, mobile radio control interface, vehicle electronics interface, camera interface, or allow the TIAN module to act as a gateway between public safety electronic equipment.

Referring now to FIGS. 7A and 7B, TIAN functional block diagrams are presented. The add-on vehicular mobile radio interface is provided through the Audio and Discrete Interface 72. The Audio and Discrete Interface 72 is coupled to a Comms-to-voice voice-over IP (or any such format) interface or VoIP interface 74, which is in turn interconnected to a network routing interface 76 and also to a TIAN network management 78. The network management function 78 is also connected to the video 71, sensors 73, and location 75 interfaces to manage the interfaces and pass the data to the Voice and Data Management function 77 for the processing and recording of all incident scene voice, video and data. The network interface is interconnected to a wireless LAN 80 or to a wired LAN 82, in one embodiment using a USB, CAN, MOST, RS-232, 10-based T, fire-wire or other protocols.

As to the standalone version of the subject system, a portable radio interface 90 is coupled to a Comms-to-VoIP interface 92, with an Audio and Discrete Interface 94 also interconnected with the Comms-to-VoIP interface. VoIP interface 92 is also coupled to a network routing interface 96 and to a TIAN network management 98 similar to the network routing interface 76 and TIAN network 78 for existing mobile radio functionality. Likewise, the network routing interface is interconnected with wireless LAN 100 and wired LAN 102, as was the case with the existing mobile radio scenario. The network management function 98 is also connected to Video/Image Generation 91, Sensors 93, and Location 95 interfaces to manage the interfaces and pass the data to the Voice, video and Data Management function 97 for processing and recording of all incident scene voice, video and data.

In operation, the Audio and Discrete Interface provides audio to digital conversion and digital and audio conversions with associated audio processing and filtering that is required in the public safety environment. Discrete signals are also provided to activate the vehicular mobile radios put-to-talk signal and to monitor the Carrier Operated Relay signal.

The Portable Radio interface 90 is part of the temporary incident area network standalone system to support the ANSI/TIA-603-B Land Mobile FM or PM Communication interface and the ANSI/TIA/EIA 102 APCO Project 25 Common Air interface in direct system mode.

The Comms to VoIP Interface function provides the all of the VoIP functionality as well as voice detection processing. The voice detection processing monitors the audio signal input from the Audio and Discrete Interface and when audio is detected the Comms to VoIP Interface function processes the voice and generates VoIP packets that are transmitted to the Network Routing Interface. When the Comms to VoIP Interface function receives VoIP packets from the Network Routing interface function, the VoIP packets are processed, the PTT signal is activated, and the audio signal is passed to the Audio and Discrete Interface audio output.

The Network Routing Interface provides the network routing function and data streaming path between the TIAN modules functions. The Network Routing Interface receives routing configurations from the Temporary incident Area Network Management function.

The Wireless LAN function provides the wireless interface to other TIAN modules. This function conforms to standard wireless protocols and air interfaces such as WiFi, 802.11, Bluetooth, and/or TIA-902. The Wireless LAN function provides a level of security.

The Wired LAN function provides an interface to standard network wire interfaces. The standard wire interfaces can provide vehicle electronic equipment broader band access over the TIAN at the scene of incident than can be achieved through the current Public Safety wireless infrastructure. Vehicle electronic equipment can include laptop computers, siren control panels, vehicle accessories, vehicle sensors, video cameras, video monitors, personal area network, local wire-line access, and cellular radio equipment.

The Video, Sensors, and Location interfaces provide the connectivity to external video equipment and sensors as well as to a location determination device. The interfaces allow the network management function to receive the data and control the external devices.

The voice and data management function is to collect the data and temporally store it locally until an external archive device is available. The voice and data management function is also responsible for managing the storage resources and provide requested data to an incident Commander Workstation.

The Temporary Incident Area Network Management function provides the all of the operational mode processing that will be described in the following section.

Temporary Incident Area Network Operational Mode Processing

The TIAN is an ad-hoc network that is temporally set up for the transfers of voice, data, and video between dissimilar first responders' IANs and PANs. The TIAN ad-hoc network is a fully distributed network that automatically operates with no centralized coordination and with minimal control overhead. Self organizing, multicasting, and mobility are key features of the network to provide transparent real time point-to-multipoint and multipoint-to-multipoint voice and data communications.

Figure 8:
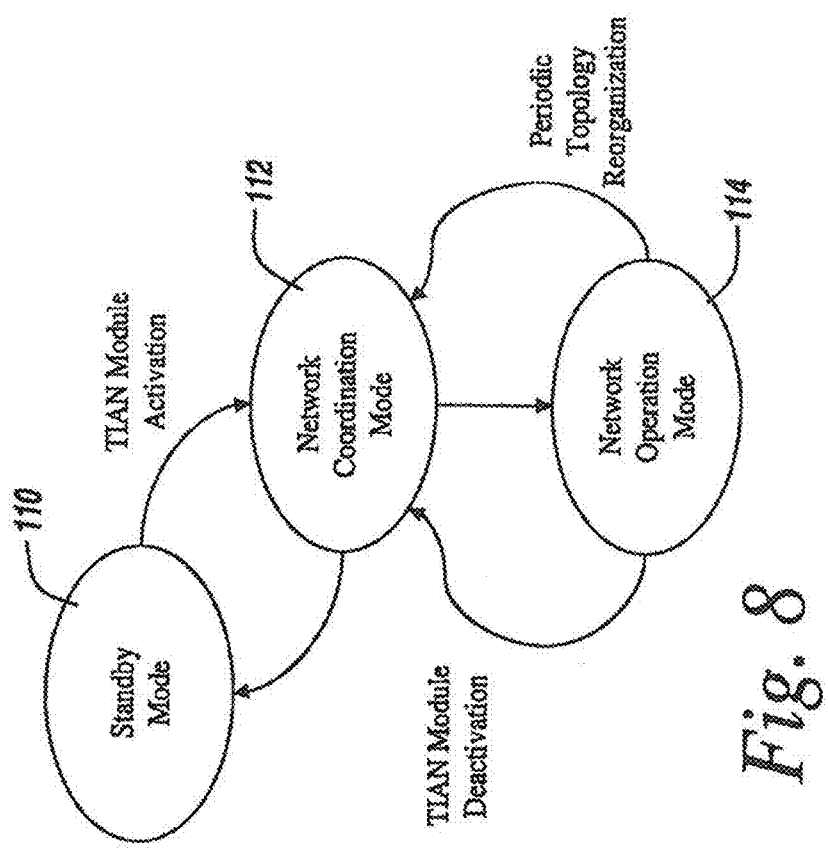
FIG. 8 is a network operational flow diagram for the subject temporary incident area network.

FIG. 8 provides the functional flow between the TIAN module's operational modes. In this figure, a Standby Mode 110 is shown interconnected to a Network Coordination Mode 112, in turn interconnected with a Network Operation Mode 114, with the diagram describing TIAN mobile module activation, TIAN module deactivation and periodic topology reorganization. The standby mode is the inactive state with the TIAN module asleep, with no active RF transmissions or RF reception. The Network Coordination Mode activates when the TIAN module is establishing, connecting, or updating the TIAN configuration. The Network Operation Mode is the state when the TIAN module is providing the gateway between the first responder's IAN/PAN and the TIAN.

Network Coordination Mode

After power is applied to the TIAN module and prior to arriving at the scene of incident, the TIAN module is in the standby mode. When the First Responders arrive at the scene of incident, they activate their TIAN modules by manually toggling a switch as they leave the vehicle or by an automatic process such as the depressing of the emergency break, driver seat sensor, placing the vehicle in park, or turning off the vehicle.

Figure 9:
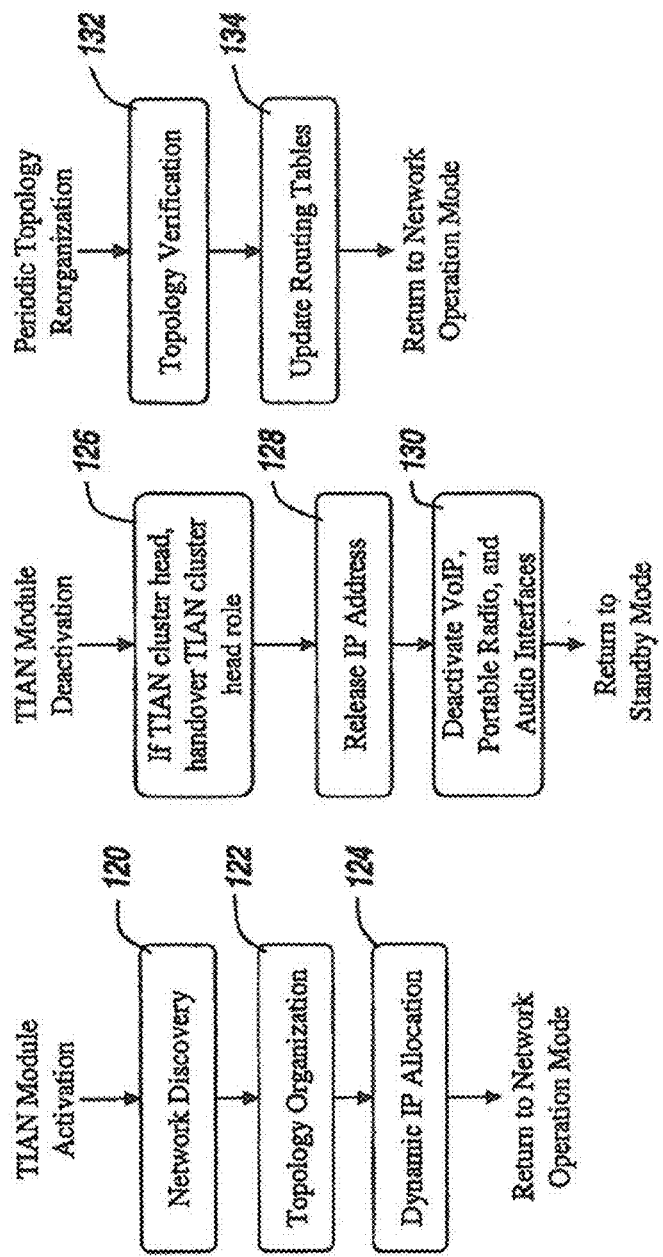
FIG. 9 is a flow chart illustrating the network coordination function of the subject temporary incident area network.

As illustrated in FIG. 9, once the TIAN module is activated, it will immediately enter the Network Coordination Mode and begin the network discovery phase 120 of operation. As shown, the discovery phase may be through a short packet transmission or beacon; or by sniffing the RF channel for network activity. When a network is discovered, the TIAN module enters the topology organization phase 122 where it collects information about their neighbors and the network. The module passes the TIAN module's identity and associated JAN/IAN parameters that the TIAN module is supporting. The topology reorganization phase is periodically performed so that node status can be updated and so that major topology changes can be detected and corrected.

Note that because each node within the TIAN must have a unique IP address, there is a dynamic IP allocation, step 124 which is accomplished, upon which the system is returned to a network operation mode.

As illustrated at 126, for TIAN mode deactivation, if the TIAN cluster head leaves the scene, then it is necessary to hand over the TIAN cluster head roll, which involves releasing all IP addresses as illustrated 128 and deactivating VoIP portable radio and audio interfaces as illustrated at 130, at which point, the system returns to the Standby Mode.

For periodic topology reorganization, as illustrated at 132, there is a topology verification mode and upon verification, routing tables are updated as illustrated at 134. After the periodic topology reorganization, the system is returned to the Network Operation Mode.

As noted above, each node within the TIAN must have a unique IF address to participate in the TIAN. Since the TIAN does not support a centralized coordination, a Dynamic Host Configuration Protocol (DHCP) cannot be supported. So a hierarchical network approach may be employed with the first module that arrives at the scene assuming the cluster head node role. When new TIAN modules arrive and discover the TIAN, they will register with the TIAN cluster head and the TIAN cluster head will allocate a new address and coordinates in a duplicate address (DAD) process. When the TIAN cluster head node is de-energized, it will automatically pass the cluster head role to a neighboring node prior to leaving the TIAN.

After the Network Coordination Mode has registered with and established a connection within the TIAN, the TIAN module will transition into the Network Operation Mode.

Network Operation Mode

Figure 10:
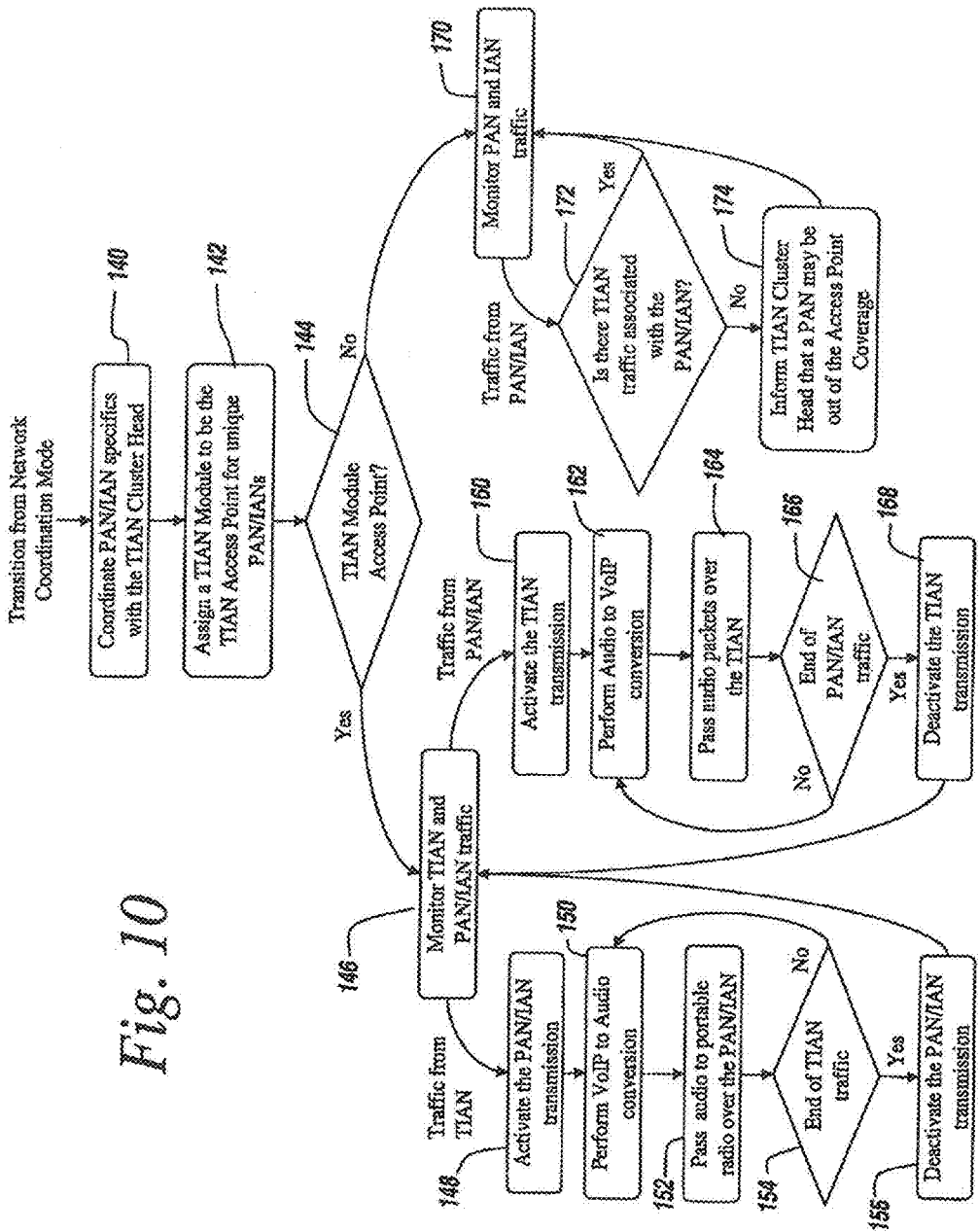
FIG. 10 is a flow chart showing the functional flow of the subject system in the networking operation mode.

Referring to FIG. 10, in terms of the network operating function, the transition from the Network coordination Mode results in the coordination of PAN/IAN specifies within the TIAN cluster head, as illustrated at 140. Thereafter, the system assigns a TIAN module to be the TIAN access point for unique PAN/IANs as illustrated at 142. The system then determines whether or not there is a module access point as illustrated at 144. If there is, then as illustrated at 146 the system monitors the TIAN and PAN traffic, if there is traffic from the TIAN, then as illustrated at 148 the system activates the PAN/TIAN transmission, followed by performing VoIP to audio conversion at 150, which in turn passes the audio to portable radios over the PAN/IAN 152. A decision is made at 154 as to whether or not there is an end to TIAN traffic and if not, the unit 150 performs its indicated VoIP-to-audio conversion again. If there is an end to the traffic, then as illustrated 156, the system deactivates the PAN/IAN transmission and provides an indication to monitor 146.

If there is traffic from the PAN/IAN, then as illustrated at 160, the system activates the TIAN transmission, performs audio to VoIP conversion at 162 and passes audio packets over the TIANs as illustrated at 164. At the end of the PAN/IAN traffic, as illustrated at decision block 166, the system deactivates the TIAN transmission as illustrated at 168; whereas if the traffic has not ended, the audio-to-VoIP conversion continues.

If, on the other hand, there is no TIAN module access point then as illustrated at 170, the system monitors PAN and IAN traffic. Traffic from PAN/IAN is monitored and as illustrated at decision block 172, if there is TIAN traffic associated with the PAN/IAN, then this fact is passed to monitor 170. If on the other hand, there is no TIAN traffic associated PAN/IAN, then as illustrated at 174, the system informs the TIAN cluster head that a PAN may be out of the access point coverage. This is passed to monitor 170 as well.

Note that the Network Operation Mode is responsible for the transfer and routing of voice, data, and video from the first responder's IAN/PAN to the TIAN. The Networking Operation Mode process begins by coordinating the TIAN modules IAN parameters with the TIAN cluster head. Some of the IAN parameters consist of the JAN that the IAN is supporting, the frequency and CTCSS tone that the IAN is operating on, and the air interface protocol that the IAN is supporting. The cluster head will assign a TIAN module to be the TIAN access point for each unique IAN.

The TIAN module will process IAN/PAN network traffic differently depending on if it is assigned to be the TIAN access point for the associated IAN. If it is the TIAN access point, the TIAN module is responsible for providing the gateway function between the TIAN and the IAN/PAN. This consists of monitoring the networks for traffic, translating the traffic to the appropriate format, and the forwarding the traffic over the opposing network.

If the TIAN module is not assigned to be the TIAN access point, then it is to monitor the IAN and TIAN traffic to detect when an IAN subscriber PAN is out of range of the assigned TIAN access point. When the TIAN module detects IAN traffic but no associated TIAN traffic, the TIAN module is to inform the TIAN cluster head that it has detected an isolated subscriber device. The TIAN cluster head may then re-assign the TIAN access point to another TIAN module.

Fire Response to a Residential Fire Call

Figure 11:
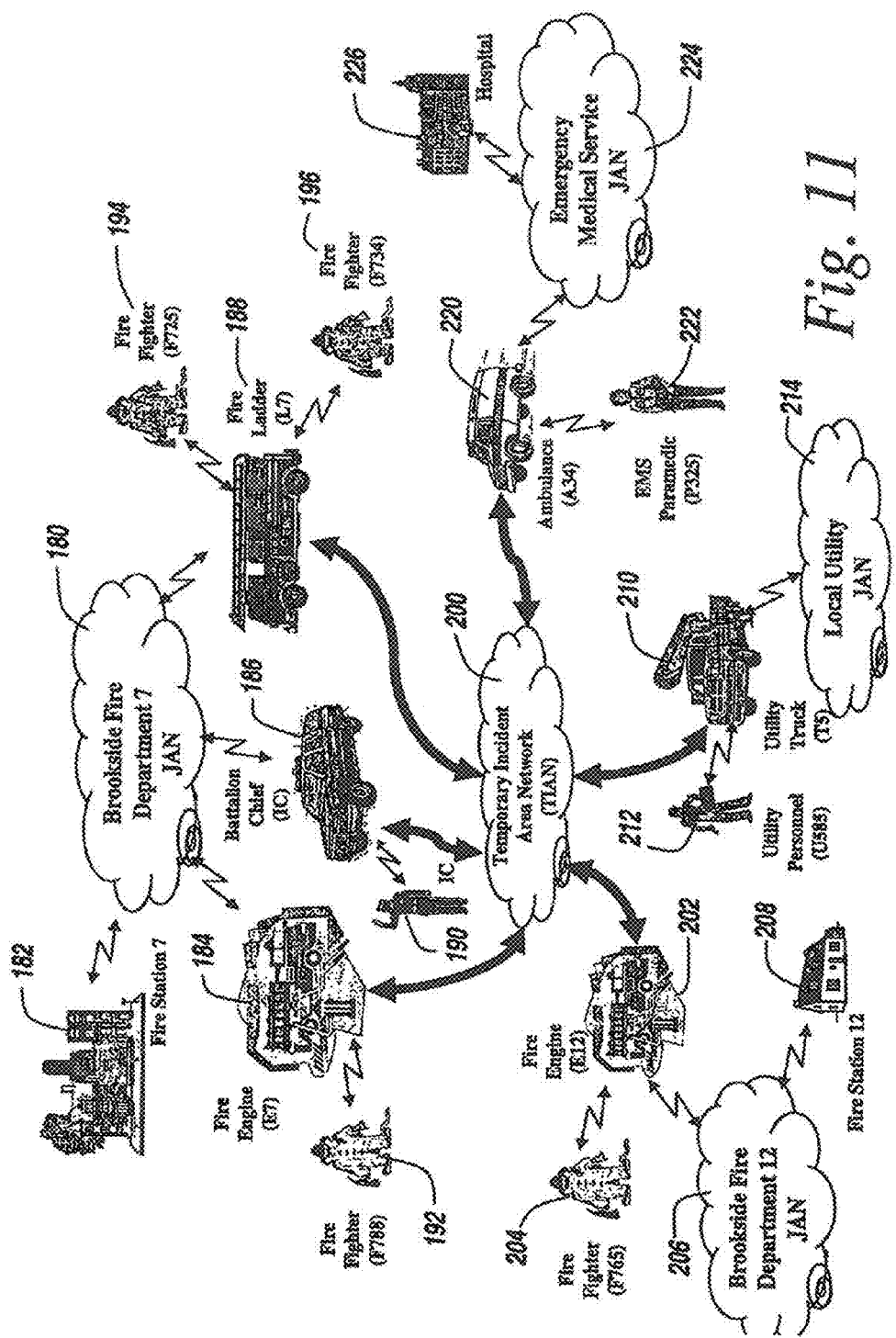
FIG. 11 is a diagrammatic illustration of a communications layout at the scene of an incident involving a response to a residential fire call.
Figure 12:
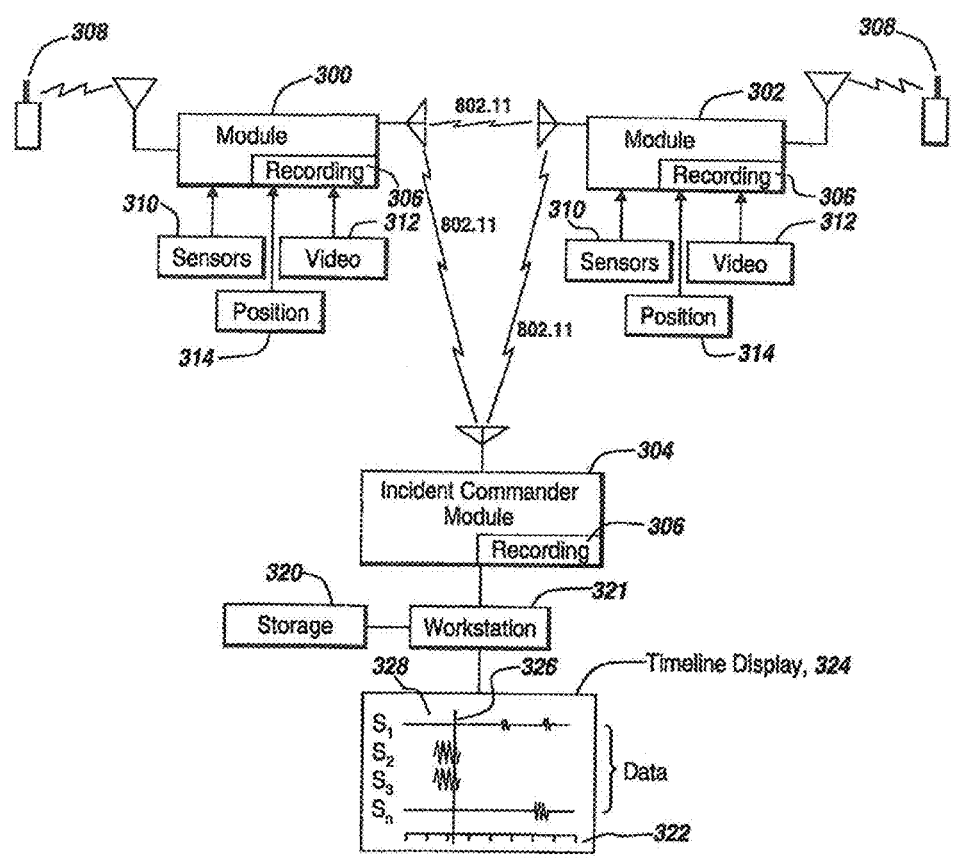
FIG. 12 is a diagrammatic illustration of the provision of local recording in each module that enables voice and data management, indicating voice and data storage and voice and data upload.

Presented in FIG. 11 is an example of how the subject TIAN works when applied to the "The Response to a Residential Fire Call" scenario presented in the "PSWC&I Statement of Requirements" Version 1.0 11 Mar. 10, 2004, section 3.3.2, pages 10 and 11 by The SAFECOM Program—Department of Homeland Security.

Referring now to FIG. 11, what is presented is the fire response to a residential call utilizing the subject temporary incident area network. Here it can be seen that a Brookside Fire Department 7 network, here illustrated at 180, communicates with fire station 182 and to, for instance, a fire engine E7 here illustrated at 184, a battalion chief incident commander vehicle 186 and, for instance, a fire ladder L-7 truck 188. Note that an incident commander 190 is in charge of the scene.

It will be further noted that a fire fighter F-788, here illustrated at 192, communicates with his fire engine 184, whereas fire fighters F-725 and F-734, here illustrated at 194 and 196 communicate directly with their particular fire ladder 188, that in return communicates over the subject temporary incident area network, here illustrated at 200. The TIAN 200 permits intercommunication between, for instance, fire engine 184, battalion chief 190 and fire fighters 194 and 196 through fire ladder 188.

Also responding to the scene may be an additional fire engine 202 having an associated fire fighter 765, here illustrated at 204, which may be associated with a different Brookside Fire Department, Brookside Fire Department 12 JAN, here illustrated at 206. JAN 206 is in turn interconnected with fire station 12, here illustrated at 208.

What the provision of the TIAN modules does is to permit fire station 12, fire fighter 204 and fire engine 202 to intercommunicate with all those at the scene, even though they are from a different fire department.

Moreover, a utility truck 210 may arrive on the scene with utility personnel 212, with utility truck 210 being connected on a different proprietary network to local utility JAN 214. Again, the TIAN module at utility truck 210 permits communication between utility personnel and the rest of the responders at the scene.

Likewise, an ambulance 220 may arrive at the scene. The ambulance transports EMS paramedics 222 to the scene, with ambulance 220 being connected over its own proprietary network to an emergency medical service JAN 224, in turn directly connected to a hospital 226.

The TIAN module at ambulance 220 interconnects the paramedic with his emergency medical service department and also the hospital, while at the same time permitting the EMS paramedic to interface with either utility personnel 212, fire fighter 204, incident commander 190 or other fire fighters 192, 194 and 196.

It is noted that in the following scenario, the "PSWC&I Statement of Requirements" have been annotated with temporary incident area network interactions.

The first section hereinafter presents the fire response scenario and the second section provides the SAFECOMM fire communications summary.

Fire Response Scenario

1. At 3:17 a.m., the Brookside public safety answering point (PSAP) receives a 9-1-1 call from a cab driver that the apartment building at 725 Pine is smoking and appears to be on fire. From the CAD display, the dispatcher finds that the BFD-7 station is available and close to the address. The dispatcher notifies BFD-7 to send 117 and L7, and to send BFD-7 battalion chief as the fire's incident commander (IC). As E7 is leaving the fire station, firefighter F788 jumps onto the back of the vehicle. The vehicle registers that F788 has become part of the E7 crew for accountability and tracking. The dispatcher simultaneously sends a digital message providing the apartment building's address. The dispatcher notifies another Brookside Fire Department, BFD-12, to also send an engine to the fire (E12). By 3:19 a.m., E7, L7, and the incident commander leave BFD-7 and report their status to the dispatcher. As the incident commander's command vehicle leaves the station, a nearby wireless PSCD sends the apartment's building plans and the locations of nearby fire hydrants, the building's water connections, the elevator, and the stairwells to the command vehicle's GIS. The dispatcher sends a reverse 9-1-1 call message to all residents of the building, which has eight apartments on each of three floors. The nearest ambulance (A34) is alerted by the dispatcher to proceed to the scene. The local utility is alerted to stand-by for communications with the IC at 725 Pine.

2. The E7, L7, and IC drivers view the apartments address on the cab monitor displays, which also maps the route for the drivers; a computer-activated voice tells the drivers what lane to be in and which turns to make. As the fire vehicles approach traffic lights along the route, the on-board signaling system changes the lights to the emergency vehicle's favor and the geo-location system provides the vehicles location and progress on the dispatcher's CAD display. The on-board system also interrogates the county's transportation system for road closures, blockages, train conflicts, or slow traffic conditions to route the vehicles around impediments and provide the fastest route to the fire.

3. The IC arrives on scene at 3:22 a.m., activates his TIAN module, assesses the situation, noting that smoke and fire are visible, and alerts dispatch that 725 Pine is a working fire. The local utility truck (T5) arrives on scene and activates his TIAN module that automatically connects in an ad hoc fashion to the IC TIAN module and establishes a temporary incident area network (TIAN). The IC directs the local utility over the TIAN to shut off the gas to 725 Pine. As L7 and E7 arrive and get into position, they activate their TIAN module, which automatically connects to the established TIAN and all fire personnel and equipment are shown on the IC's GIS display. The TIAN modules automatically set up the tactical communications channels for the IC and the fire crews. The fire crews are able to talk continuously with each other, reporting conditions and warning of hazards. Because the apartment building is not large enough to require a built-in wireless incident area network for emergency services, the first fire crew into the apartment drops self-organizing wireless TIAN modules on each of the floors at they progress through the building. Soon E12 and the assigned EMS module arrive on site, activate their TIAN module that automatically connects to the TIAN. The new personnel and equipment are automatically registered over the TIAN with the IC commander and a communication path is established over the TIAN. FIG. 11 shows a communication layout at the scene of incident and how the TIAN provides a connection between the first responders from different responding agencies.

4. Several families have already evacuated the building. As firefighters ask for their names and apartment numbers, they use the voice recognition capabilities of their PSCDs to capture the information, applying an RF ID wrist strap to each resident to track their status and location. Other firefighters enter the building to guide survivors out and to rescue those who are trapped. The IR cameras on the firefighter's helmets pass video over the TIAN to provide the IC a view of fire conditions within the building and where the hot spots are located. Additionally, the firefighters monitor the temperature of the surrounding an in their location. This information is directly available over the TIAN to the firefighter, as well as the IC and EMS module on-scene. Other passive sensors, such as hazardous gas detectors, are also operating in the firefighter's PAN and this data is distributed over the TIAN. With the IC's guidance, the firefighters search each apartment for survivors and the source of the fire. The IC is able to monitor the location of each firefighter and is aware of which apartments have been searched by the information provided on the GIS displays.

5. The EMS module outside the apartment uses the TIAN to monitor the vital signs of all the firefighters in and around the fire scene. The module alerts the IC that firefighter F725 is showing signs of distress and the IC orders F725 and his partner F734 out of the building for a check-up with the EMS team.

6. Firefighter F765 pushes his emergency button when he becomes disoriented in the smoke. The emergency call is sent as a priority message over the TIAN to the IC where an alarm is generated and a communication path is established between the IC and firefighter F765. The IC immediately directs firefighter F788 to his aid by providing F765's location relative to F788.

7. While the firefighters check every apartment for victims, the main fire is discovered in a second floor apartment kitchen where an electric range is burning. Two adults and two children are discovered in the apartment suffering from smoke inhalation. RF IDs are attached to their arms and each is given an oxygen tank and mask to help their breathing. They are earned outside the building where the EMS module is ready to take over medical aid.

8. While the firefighters put out the fire in apartment 202, the IC checks the GIS display, which shows where the fire personnel are and where all the survivors and rescued individuals live in the apartment building. Two top-floor apartments have not been searched and the IC moves fire personnel to those apartments. The apartment database indicates an invalid may be living in apartment 321. The firefighters break down the doors of both apartments and in 321 find a bedridden individual, who is in good condition, and a pet dog in the other apartment. Both are outfitted with RF ID devices and taken from the building.

9. The fire is brought under control. The IC releases E12 and the IC disconnects E12's TIAN modules from the IAN. E7 and L7 wrap their fire operations and A34 has to transport one fire victim to the hospital. The IC releases all remaining equipment, disconnects their TIAN modules, and gives control to dispatch.

Fire Communications Summary

Throughout the scenario, the fire personnel and equipment. EMS support personnel, and the fire victims interoperate over the TIAN. They are tracked by the TIAN providing geo-location information in real time, providing the Incident Commander with current accountability of public safety personnel and of the fire's victims. AU victim information and vitals are recorded through TIAN wireless monitors and voice recognition systems with no reliance on paper reports and notes. All fire personnel and equipment have monitors to measure vital conditions and status that are reported by the wireless PAN and TIAN systems to the ICs GIS. The GIS also has access to city building department databases, which are searched and queried for building information and plans, fire hydrant locations, etc.

Incident Recording at Each Module

In order to obtain the full advantage of the temporary incident area network, each of the aforementioned modules, here illustrated at 300, 302 and 304, is provided with a recording capability 306 such that at each node on the network functions there is a separate recording facility.

Each of modules 300 and 302 may be a handheld battery-powered unit. The result of the size and weight of this type of module means that the ability to record is somewhat limited due to size and power constraints. As described above, each of the modules provides an interface to the responder's portable radio 308 and connects dissimilar portable radios across a temporary incident area network such as 802.11. More particularly, each module is coupled to a transceiver 308 that provides push-talk, audio in and audio out functions as well as communications channel selection.

Within each module is a transceiver that takes the information from the associated transceiver 308 and converts it into a common frequency and modulation format, such as 802.11.

As illustrated, module 300 and 302 may be provided with sensors 310, video inputs 312 and position information 314 such that sensor data, video and position information can be obtained from the incident scene right at the position of the first responder.

Sensor, video and position information is referred to herein as data and this data is transmitted both between modules 300 and 302 and to incident commander module 304, which represents a node on the ad hoc network. The incident commander module is provided with sufficient storage 320 to be able to record all of the data received from all of the modules at the crisis scene, with the incident commander module coupled to a work station 321. What will be appreciated is that a small amount of data is recorded in real time at each of modules 300 and 302, with the stored data uploaded to the single node on the network where there is sufficient storage, in one, embodiment the incident command module 304. The uploading can be done in semi-real time and is time-stamped such that the data is stored with time stamps to be able to generate a timeline 322 at a display 324.

As mentioned hereinbefore, the amount of recording done at the modules associated with first responders is limited and the uploaded data from these modules can be thought of as real-time streaming of data to the point at the node at which sufficient storage exists.

Since the data from modules 300 and 302 is available in semi-real time and time-stamped, storage 320 can be accessed to provide a display of the data in juxtaposition to timeline 322 that can be placed at the bottom of display 324. A vertically running cursor line or marker 326 is laterally movable to designate the particular time segment in the timeline that one is interested in; and data on the lines thereabove can be accessed to provide video, audio or display data from sensors.

Moreover, a map 328 may be superimposed over the data on screen 324 and the position on the map of the particular first responder providing data input at the time associated with marker 326 can be shown.

It will be appreciated in such a situation that all of the data that has been accumulated in the course of the incident can be stored at one node on the network and can be displayed in real time to an incident commander so that the incident commander can get a realistic picture of what is happening during the crisis or what has previously happened at the incident.

Moreover, and as mentioned above, storage of the information in storage 320 also permits readout of the storage at any later time for post-incident analysis and training purposes.

The temporary incident area network is therefore provided with recording capability at each node on the network so that a re-enactment or replay of the incident is readily available to the incident commander and is readily available for post-incident activities.

Figure 13:
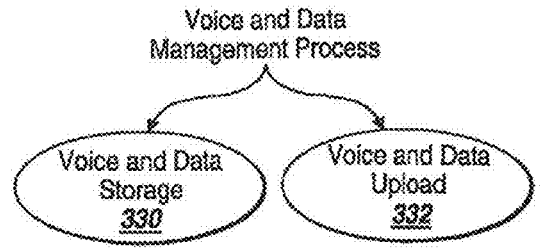
FIG. 13 is a flow chart showing the voice and data recording process.

Referring to FIG. 13, what is shown is the voice and data management process to include voice and data storage, here illustrated at 330, and voice and data upload as illustrated at 332.

Figure 14:
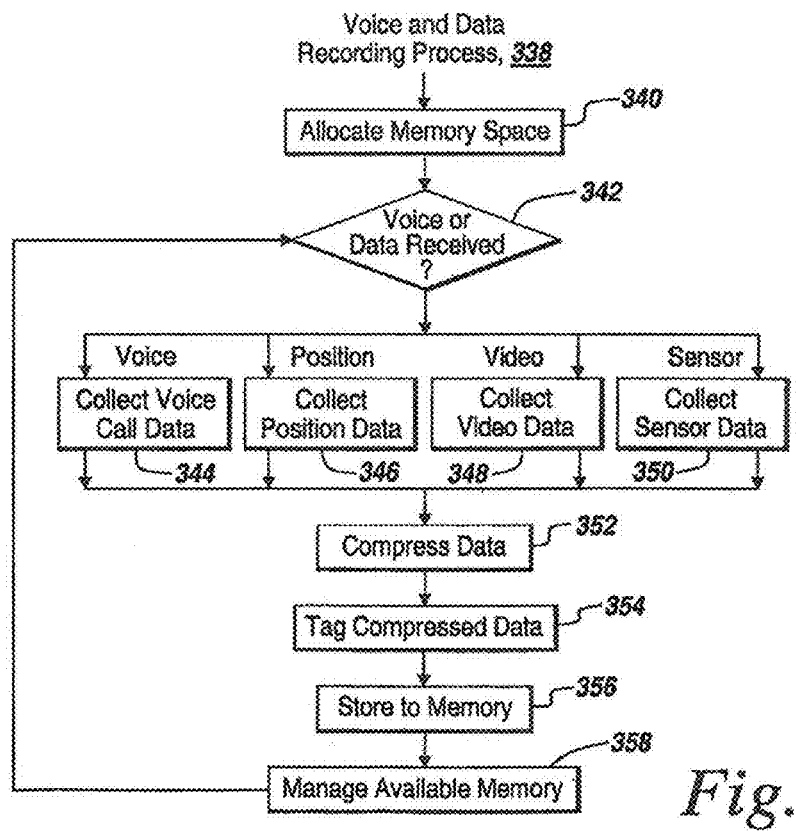
FIG. 14 is an expanded flow chart showing the voice and data recording process in more detail.

Referring now to FIG. 14, what is shown is a flow chart of the voice and data recording process, here illustrated by reference character 338. Here it can be seen that the first step in the process, as illustrated at 340, is to allocate memory space and to determine at 342 whether voice or data has been received. If so, as illustrated at 344, one can collect voice call data at the module. As illustrated at 346, one can collect position data, whereas as illustrated at 348, one can collect video data. Also, one can collect sensor data as illustrated at 350.

All of this collected data is compressed as illustrated at 352, with the compressed data being tagged as illustrated at 354, and stored to memory as illustrated at 356.

Thereafter, as illustrated at 358, one manages the available memory so as to be able to present to the user that data which has been derived from the incident to permit further management of the incident, or for analysis and teaching purposes.

As to voice recording, it is noted that in one embodiment voice is recorded at each module. Thus in terms of recording, the recording function of each module is such that all voice calls are recorded into and out of the module. Note that the recorded data can be compressed for memory optimization. The recorded voice can be saved for either uploading or downloading later. In one embodiment, the minimum storage time required is set to one shift. Note that storage depth is dependent on available memory space.

It will be appreciated that voice information for each call can be tagged with a source tag identifying the source of the voice call. Note that a talk group tag can be used to identify the associated talk group. Moreover, a location tag can be used to identify the first responder's position. Note further that the time tag is relative to the recording computer. If GPS is available, then the time tag can be referenced to GPS local time.

As to voice storage requirements, since voice storage space is limited within the module, one can minimize storage by recording only voice traffic that is received over the network.

By way of example, portable radio batteries are usually designed for an eight-hour shift, with 10% transmit, 10% receive and 80% standby. This means that for eight hours, one has 48 minutes or 2880 seconds for reception. At one byte per sample, one has approximately 25 megabytes of reception per shift.

As to compression algorithms, approximately 50% compression (G.726) with lossless circuit switch techniques results in approximately 13 Mbytes of storage required. With approximately 80% compression (GSM) with lossy cell phone techniques, one has a storage requirement of approximately 5 Mbytes. With approximately 87% compression (G.279a) with lossy VoIP techniques, this associates with approximately 3 Mbytes of storage.

Allocating 50 Mbytes for voice storage within each module and with approximately 100 minutes of recorded voice traffic, one can use the G.726 voice compression at 50%; 8 bits per sample at 8 KSPS, and 10% overhead for traffic ID.

For position information recorded by each module, it is important to record all position updates. Position updates occur after traveling more than a defined distance from the last recorded position, which distance may be a function of speed. Note that the recorded data is desirably compressed for memory optimization.

As will be appreciated, the position information may be stored for downloading later, noting a minimum storage time to be that associated with one shift. Again storage depth is dependent upon available memory space.

Position information is also to be tagged with a source tag identifying the source of position data and a time tag relative again to the recording computer.

As to position storage requirements, with 20 bytes of position data to be stored for each sample, the day of the year requires 2 bytes; the time of day requires 1 byte for the hour; one byte for the minutes and one byte for the seconds.

For latitude and longitude, each requires one byte for degrees, one byte for minutes and one byte for seconds. The same is true for altitude, with an overhead of approximately 6 bytes rounding out the 20 bytes.

If the modules record position for eight-hour shifts, then recording every minute requires 10 kilobytes of storage; every 30 seconds, 20 kilobytes; and every 10 seconds, 60 kilobytes.

In one embodiment, allocating 0.5 Mbytes per module for position information, one allocates 420 kilobytes for 7 responders with wearable modules and 60 kilobytes for vehicle-mounted modules.

Finally, as to video information recording, one would need to record all video information over the local video port, with the recorded data to be compressed and with the video saved for later uploading or downloading. Again, the minimum storage time is dependent on available memory space. As mentioned above, video information is to be tagged as to source, location and time.

Figure 15:
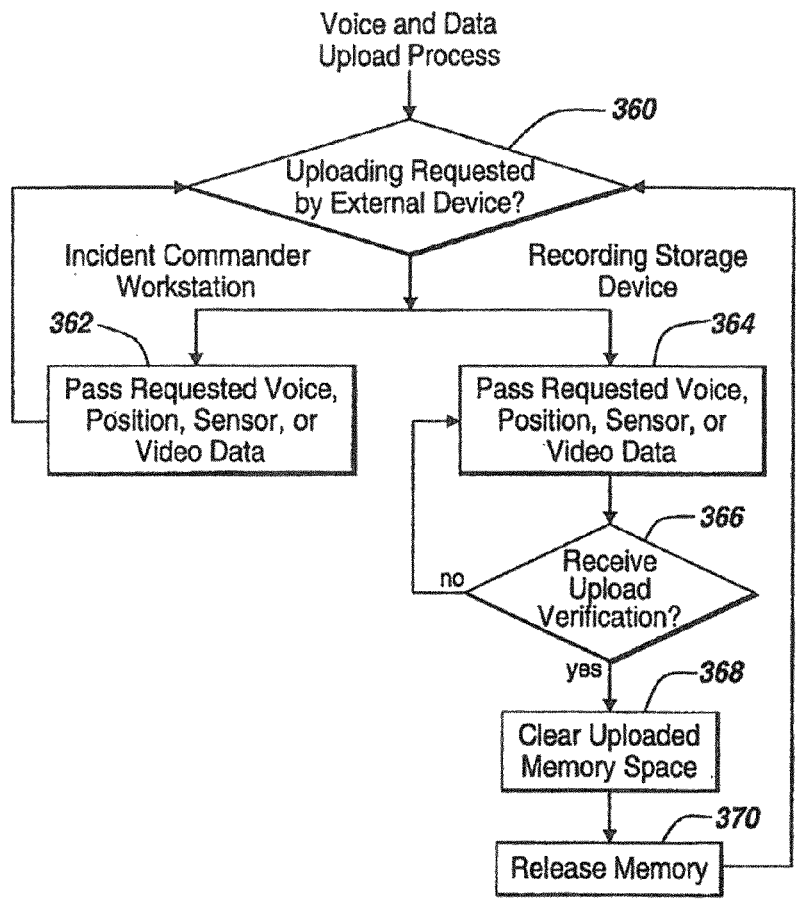
FIG. 15 is a flow chart of the uploading process for the transfer of stored data to an incident commander work station or to an archive recording device; and, FIG. 16 is a diagrammatic illustration of an incident commander work station in which a timeline is displayed along with uploaded stored data to permit selection of portions of the timeline and associated data derived from the incident.

Referring now to FIG. 15, as to the flow of recording and uploading, uploading is requested by an external device as illustrated at 360. Passing the requested voice, position, sensor and/or video data to an incident commander module is illustrated at 362.

If to be downloaded at an archive storage device, as illustrated at 364 this data is passed to storage as illustrated at 364.

In one embodiment, prior to clearing the memory of stored data, the archive storage device must verify that it has accurately received all of the data and stored it. Upload is verified at 366. After receipt of the upload verification, the memory space can be cleared as illustrated at 368 and the memory is released for storing new data as illustrated at 370.

Figure 16:
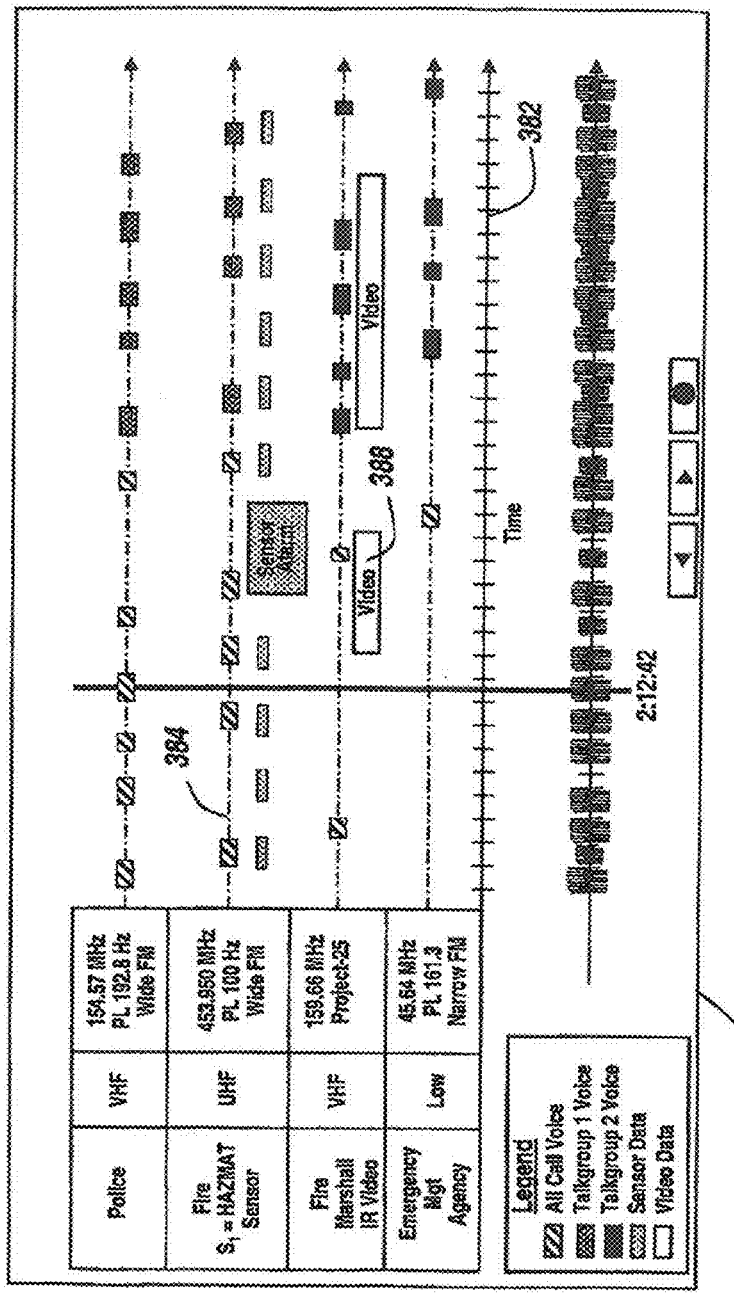

Referring to FIG. 16, what is shown is a screen shot of the monitor at the incident commander work station in which it is possible to designate a timeline of recorded sensor data, image data and audio data.

Here it can be seen that a monitor 380 contains a timeline 382 at the bottom thereof, with the remainder of the screen having the designated sensor, video or audio input running horizontally across the screen above the timeline.

For instance, if sensor Si is a HAZMAT sensor on a fireman, one might want to have the absolute value of the HAZMAT output displayed along line 384 so that one could track the HAZMAT sensor output during the passage of time. One can see the relationship of sensor data and sensor alarm relative to voice traffic and responder activity. One can play back the sensor readout, video/image, and voice traffic so that the incident commander can be provided the information he or she needs to make proper decisions.

Likewise, beneath the sensor line could be audio recordings 386 from the fireman, again tagged by a time stamp so that one could look at the HAZMAT data and have an audio output of the verbal interchange that is going on with respect to the HAZMAT data from the fireman at the designated timeline interval.

As will be appreciated, one could also select the video data originated by the fire marshal from the screen as illustrated at 388 at the indicated point in the timeline at which one wants to ascertain the import of the HAZMAT data Note that all of the stored data inputs are accessible, either individually or integrated with other selected data based on the time of occurrence as specified by the timeline.

It is also possible to have an applet that overlays a map of the incident site or at least the positions of the first responders at the incident site so that an incident commander can ascertain where his personnel are at the incident scene and thereby correlate their position with measured data and video as well as audio data, thus to be able to command his forces for maximal effect.

In essence, what the incident commander's work station is used for is to provide the incident commander with instant replay of what is happening at the incident scene as well as to provide a record of the history of the incident.

Not only is providing the modules with their own mini-recording devices useful in keeping a kind of scratch-pad record of what is going on at the first responders' location during the incident, the storage operates as a redundant backup for all of the recorded material. As mentioned hereinbefore, the storage of the timeline-designated events in terms of the sensor and other data provides for post-incident analysis and future training as well as being able to give a semi-real time assessment of what is going on at the incident site.

Since all of the modules are interconnected through the use of a common temporary incident area interface, and since each module can hear each of the other modules, providing one of the nodes with a module with a large amount of storage permits the recording of a continuous, uninterrupted incident report based on data that is provided in semi-real time from each of the first responders at the incident scene.

Thus, it is not necessary to rely on the memories or the observational skills of the first responders in order to be able to further direct the responders at the scene or to reconstruct what happened.

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A method, comprising the steps of:
providing a plurality of modules which are remote from an incident command location and have respective first transceivers which are set to a predetermined common frequency and format, and a plurality of second transceivers which are respectively coupled to the first transceivers;
automatically establishing an ad hoc temporary incident area network between the first transceivers so as to provide communication between the first transceivers;
receiving at each of the first transceivers signals from the second transceiver coupled thereto at a frequency and format which is not compatible with the predetermined common frequency and format;
using the first transceivers to automatically establish interoperability between the second transceivers by converting the signals to the predetermined common frequency and format;
recording data at each of the modules relating to an incident at which first responders respond;
transmitting said data over said network to a node on said network;
storing received data at said node; and, playing back stored data to establish what was happening at each of said modules in the course of responding to said incident.

2. The method of claim 1, further including the steps of time-stamping the data recorded at each of said modules so that the data is stored with time stamps, and reading out said stored data in a time sequence corresponding to a timeline of the incident.

3. The method of claim 2 further including the step of providing an incident commander terminal having a display at the node at which the data is stored and reading out the stored data at the incident commander terminal to the display to provide situational awareness for permitting the incident commander to assess the response to the incident and to further direct the first responders based on an analysis of the stored data.

4. The method of claim 3, wherein the recorded data is taken from a group consisting of audio communications, image data, sensor data and location data.

5. The method of claim 4, further including the step of overlaying the displayed data with a map of the incident area and superimposing the position of the first responders on the map.

6. The method of claim 3, wherein the recorded data is taken from sensors and wherein the sensors are taken from a group consisting of position sensors, air quality sensors, radiation sensors, temperature sensors, oxygen tank sensors, biometric sensors and HAZMAT sensors.

7. An apparatus comprising:
a plurality of modules having respective first transceivers which are set to a predetermined common frequency and format, the modules being remote from an incident command location;
a plurality of second transceivers which are respectively coupled to the first transceivers;
a temporary incident area network which is automatically established between the first transceivers so as to provide communication between the first transceivers, wherein each of the first transceivers receives signals from the second transceiver coupled thereto at a frequency and format which is not compatible with the predetermined common frequency and format, and wherein the first transceivers automatically establish interoperability between the second transceivers by converting the signals to the predetermined common frequency and format;
recording units respectively at said modules to record data collected respectively at said modules;
means for downloading recorded data over said network to a node on said network;
storage at said node for storing data transmitted over said network; and,
a circuit for reading out said storage in a time sequence to provide a replay corresponding to the data collected at each of said modules, whereby an incident commander can be provided with a replay of conditions existing during an incident.

8. The apparatus of claim 7, wherein said node includes an incident commander terminal having a display, and further including means for making the stored data available at said display in a time sequence controllable by an individual thereat.

9. The apparatus of claim 8, and further including a timeline presented on said display and means for presenting stored data that occurs within a given time interval associated with said timeline.

* * * * *